(12) United States Patent
Lee et al.

(10) Patent No.: US 12,304,285 B2
(45) Date of Patent: May 20, 2025

(54) VEHICLE AIR CONDITIONER

(71) Applicants: HYUNDAI MOTOR COMPANY, Seoul (KR); KIA CORPORATION, Seoul (KR); HANON SYSTEMS, Daejeon (KR)

(72) Inventors: Seung Ho Lee, Daejeon (KR); Seo-Jun Yoon, Daejeon (KR); Sang Ki Lee, Daejeon (KR); Yong Sik Kim, Daejeon (KR); Cheol Han Jang, Daejeon (KR); Eung Young Kim, Anyang-si (KR); Myung Hun Kang, Gwangmyeong-si (KR); Jung Mo Kwak, Gunpo-si (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 443 days.

(21) Appl. No.: 17/609,343

(22) PCT Filed: May 8, 2020

(86) PCT No.: PCT/KR2020/006105
§ 371 (c)(1),
(2) Date: Nov. 5, 2021

(87) PCT Pub. No.: WO2020/231102
PCT Pub. Date: Nov. 19, 2020

(65) Prior Publication Data
US 2022/0314750 A1    Oct. 6, 2022

(30) Foreign Application Priority Data

May 10, 2019   (KR) .................... 10-2019-0055236
Feb. 24, 2020   (KR) .................... 10-2020-0022233

(51) Int. Cl.
 *B60H 3/06*   (2006.01)
 *B60H 1/00*   (2006.01)
(52) U.S. Cl.
 CPC ..... B60H 3/0616 (2013.01); *B60H 2001/006* (2013.01)
(58) Field of Classification Search
 CPC ............. B60H 1/00514; B60H 3/0608; B60H 3/0616; B60H 3/0658; B60H 2001/006; B01D 46/0004; G10K 11/168
 See application file for complete search history.

(56) References Cited

U.S. PATENT DOCUMENTS

| | | | |
|---|---|---|---|
| 7,520,804 B2 | 4/2009 | Venkatappa et al. | |
| 2004/0099474 A1* | 5/2004 | Campbell | ............. B60R 13/083 181/204 |

(Continued)

FOREIGN PATENT DOCUMENTS

| | | |
|---|---|---|
| CN | 107438527 | 12/2017 |
| DE | 4212704 | 10/1993 |

(Continued)

*Primary Examiner* — Jorge A Pereiro
*Assistant Examiner* — Michael James Giordano
(74) *Attorney, Agent, or Firm* — Morgan, Lewis & Bockius LLP (57) ABSTRACT

Proposed is a vehicle air conditioner, which performs cooling and heating by supplying cold air and hot air in an interior of the vehicle. The vehicle air conditioner includes an intake unit installed at an engine room and configured to suction and blows internal and external air to the interior, a heat exchanger unit configured to cool or heat and supply air blown from the intake unit, a case cover installed on an outer surface of the intake unit to cover the intake unit, and a case soundproofing member installed between an intake case of (Continued)

the intake unit and the case cover and configured to block noise that is transmitted to the intake case from the outside of the case cover.

15 Claims, 9 Drawing Sheets

(56) References Cited

U.S. PATENT DOCUMENTS

| | | | | |
|---|---|---|---|---|
| 2007/0238406 | A1* | 10/2007 | Jeong | B60H 1/00849 454/145 |
| 2013/0074459 | A1 | 3/2013 | Kuwada et al. | |
| 2017/0136852 | A1* | 5/2017 | Ishii | B01D 46/10 |
| 2017/0203631 | A1* | 7/2017 | Ryu | B60H 1/22 |
| 2017/0210198 | A1 | 7/2017 | Person et al. | |
| 2018/0056222 | A1 | 3/2018 | Inuzuka | |
| 2019/0176569 | A1* | 6/2019 | Hensler | B60H 1/00521 |

FOREIGN PATENT DOCUMENTS

| | | | |
|---|---|---|---|
| DE | 102014202365 | | 8/2015 |
| EP | 0818337 | | 1/1998 |
| EP | 2634023 | | 9/2013 |
| FR | 2727903 A1 | * | 6/1996 ........... B60H 3/0616 |
| JP | 2503215 B2 | * | 6/1996 |
| JP | h08150825 A | | 6/1996 |
| JP | h09134179 A | | 5/1997 |
| JP | H10-250342 | | 9/1998 |
| JP | 19990031704 U | | 7/1999 |
| JP | H11-182980 | | 7/1999 |
| JP | 2000038014 A | | 2/2000 |
| JP | 2006-123815 | | 5/2006 |
| JP | 2006257993 A | * | 9/2006 |
| JP | 2008-120219 | | 5/2008 |
| JP | 2015-045494 | | 3/2015 |
| JP | 2015-193271 | | 11/2015 |
| KR | 19980030573 U | * | 8/1998 |
| KR | 1999-0031704 U | | 7/1999 |
| KR | 10-2006-0089198 | | 8/2006 |
| KR | 10-2008-0035264 | | 4/2008 |
| KR | 10-2008-0089921 | | 10/2008 |
| KR | 10-2015-0068584 | | 6/2015 |
| KR | 10-2015-0130572 | | 11/2015 |
| KR | 10-2016-0111849 | | 9/2016 |
| KR | 10-2018-0038728 A | | 4/2018 |
| KR | 10-2018-0127604 | | 11/2018 |
| WO | WO2015/141359 | | 9/2015 |

* cited by examiner

VEHICLE AIR CONDITIONER

CROSS-REFERENCE TO RELATED APPLICATION

The present application is a U.S. National Phase entry of International Patent Application No. PCT/KR2020/006105, filed May 8, 2020, which claims priority to Korean Patent Application No. 10-2020-0022233, filed Feb. 24, 2020 and Korean Patent Application No. 10-2019-0055236, filed May 10, 2019, the entire contents of which are incorporated herein for all purposes by this reference.

TECHNICAL FIELD

The present invention relates to a vehicle air conditioner and, more particularly, a vehicle air conditioner that includes an intake unit installed at an engine room, enables an air filter of the intake unit to be more easily taken out, inserted, and replaced at the engine room, and can improve the interior quietness by preventing noise from entering to the interior from the engine room even though the intake unit is installed in the engine room.

BACKGROUND ART

Figure 1:
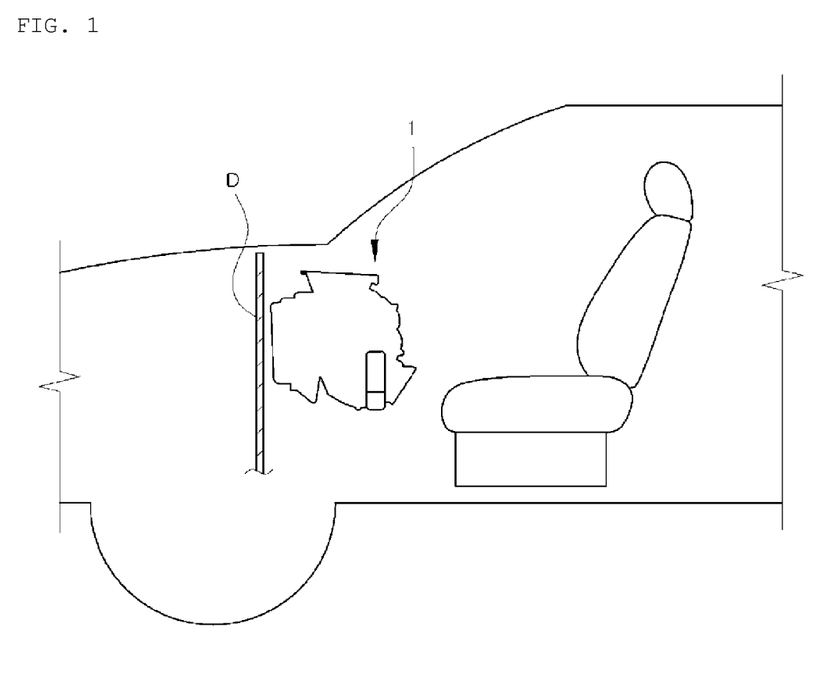
FIG. 1 is a side view schematically showing a vehicle air conditioner of the related art.
Figure 2:
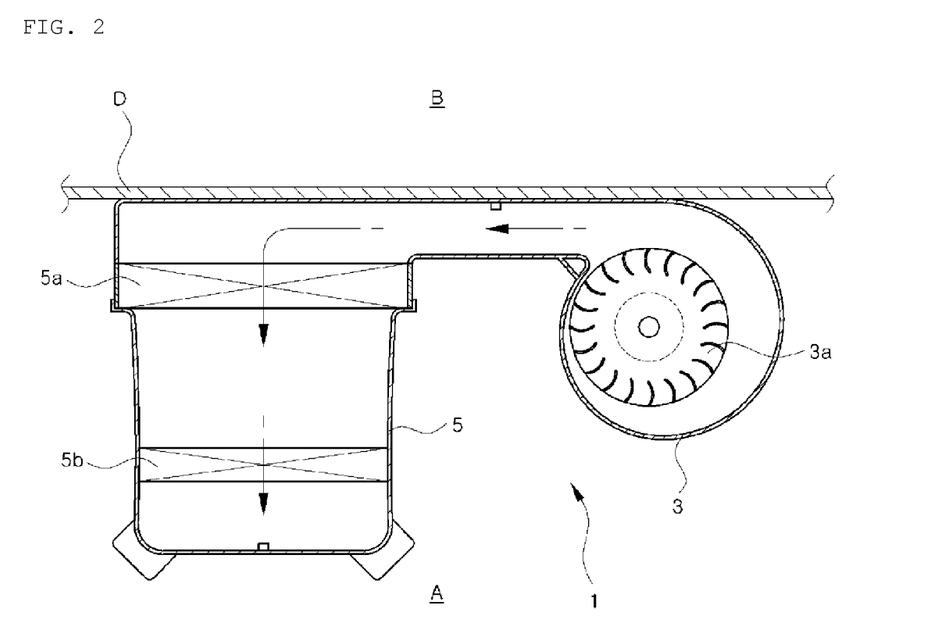
FIG. 2 is a horizontal cross-sectional view showing the vehicle air conditioner of the related art.

A vehicle, as shown in FIGS. 1 and 2, is equipped with an air conditioner 1 for cooling and heating the interior thereof.

The air conditioner 1 includes an intake unit 3 that suctions and blows internal/external air to the interior, and a heat exchanger unit 5 that cools or heats the air that is blown to the interior.

The intake unit 3 has internal and external air intake ports (not shown) through which internal/external air can be introduced, and a blower 3a that blows the introduced internal/external air to the heat exchanger unit 5. The intake unit 3 suctions air inside and outside the vehicle and blows the air to the interior A.

The heat exchanger unit 5 includes an evaporator 5a and a heater 5b, and cools or heats the internal air/external air blown from the intake unit 1. Accordingly, the interior A is cooled or heated.

Such an air conditioner is usually installed in the interior A with respect to a dash panel D. In this case, the external air intake port of the intake unit 1 communicates with the interior to introduce exterior air.

However, since the air conditioner of the related art is installed in the interior A with respect to the dash panel D, there is a defect that it is very disadvantageous to secure space in the interior.

In particular, it is recently strongly required to secure the space in a vehicle interior for convenience for passengers, but there is a problem that the air conditioner 1 of the related art that is installed in the interior cannot cope with the trend of securing space in the interior. Further, there is a defect that there is limitation in securing space in the interior due to this problem.

DISCLOSURE

Technical Problem

The present invention has been made in an effort to solve the problems of the related art described above and an objective of the present invention is to provide a vehicle air conditioner that can minimize the part disposed in an interior of a vehicle by improving the arrangement structure, installation position, etc. of an intake unit and a heat exchanger unit.

Another objective of the present invention is to provide a vehicle air conditioner that can be minimally disposed in the interior of a vehicle, thereby being advantageous in securing space in the interior, being able to increase the spatial usability of the interior, and being able to improve convenience for passengers.

Technical Solution

In order to achieve the objectives, a vehicle air conditioner according to the present invention performs cooling and heating by supplying cold air and hot air in an interior of the vehicle, and includes: an intake unit installed at an engine room and configured to suction and blow internal and external air to the interior; a heat exchanger unit configured to cool or heat air blown from the intake unit and supply the cooled or heated air to the interior of the vehicle; a case cover installed on an outer surface of the intake unit to cover the intake unit; and a case soundproofing member installed between an intake case of the intake unit and the case cover and configured to block noise that is transmitted to the intake case from the outside of the case cover.

The vehicle air conditioner may further include a filter extractor configured to enable an air filter installed in an internal channel of the intake unit to be extracted from the outside of the case cover, in which the filter extractor may have: a first filter port formed at the intake case of the intake unit; a second filter port formed at the case cover to be able to be aligned with the first filter port; and a filter cover configured to be able to open and close the second filter port.

The air filter may be mounted at a predetermined angle in the interior channel of the intake unit such that a front portion corresponding to a front of vehicle is positioned higher than a rear portion corresponding to a rear of the vehicle; and the first and second filter ports of the filter extractor may enable the air filter to be extracted or inserted at the predetermined angle to correspond to a mounted posture of the air filter inclined at the predetermined angle.

The filter cover may have a cap protruding toward the second filter port of the case cover; and the cap may directly block and close the second filter port of the case cover when the second filter port is closed by the filter cover.

Advantageous Effects

According to the vehicle air conditioner of the present invention, since the intake unit is disposed in the engine room and the heat exchanger unit disposed in the interior, there is an effect that the portion of the air conditioner that is disposed in the interior can be minimized.

Further, since the portion of the air conditioner that is disposed in the interior can be minimized, it is easy to secure space in the interior, there is an effect that the spatial usability of the interior is increased, whereby it is possible to remarkably improve convenience for passengers.

Further, since the intake unit is installed in the engine room and is covered with separate case cover and case soundproofing member, there is an effect that it is possible to protect the intake unit from noise, foreign substances, and water in the engine room.

Further, even though the intake unit is installed in the engine room, the noise from the engine room cannot enter the interior, so there is an effect that quietness of the interior can be improved.

Further, since the structure for extracting and inserting the air filter that is installed in the intake unit is improved, there is an effect that the air filter can be very easily extracted and inserted even though the intake unit is installed in the engine room, whereby it is possible to more easily replace the air filter.

Further, since the structure for extracting and inserting the air filter is improved, there is an effect that the air filter can be easily extracted and inserted even though a triple case structure is formed by installing the case cover and the case soundproofing member on the outer surface of the intake unit, and as a result, it is possible to more easily replace the air filter 60 without inward and outward leakage of air.

BEST MODE

Hereafter, an embodiment of a vehicle air conditioner according to the present invention is described in detail with reference to the accompanying drawings.

Figure 3:
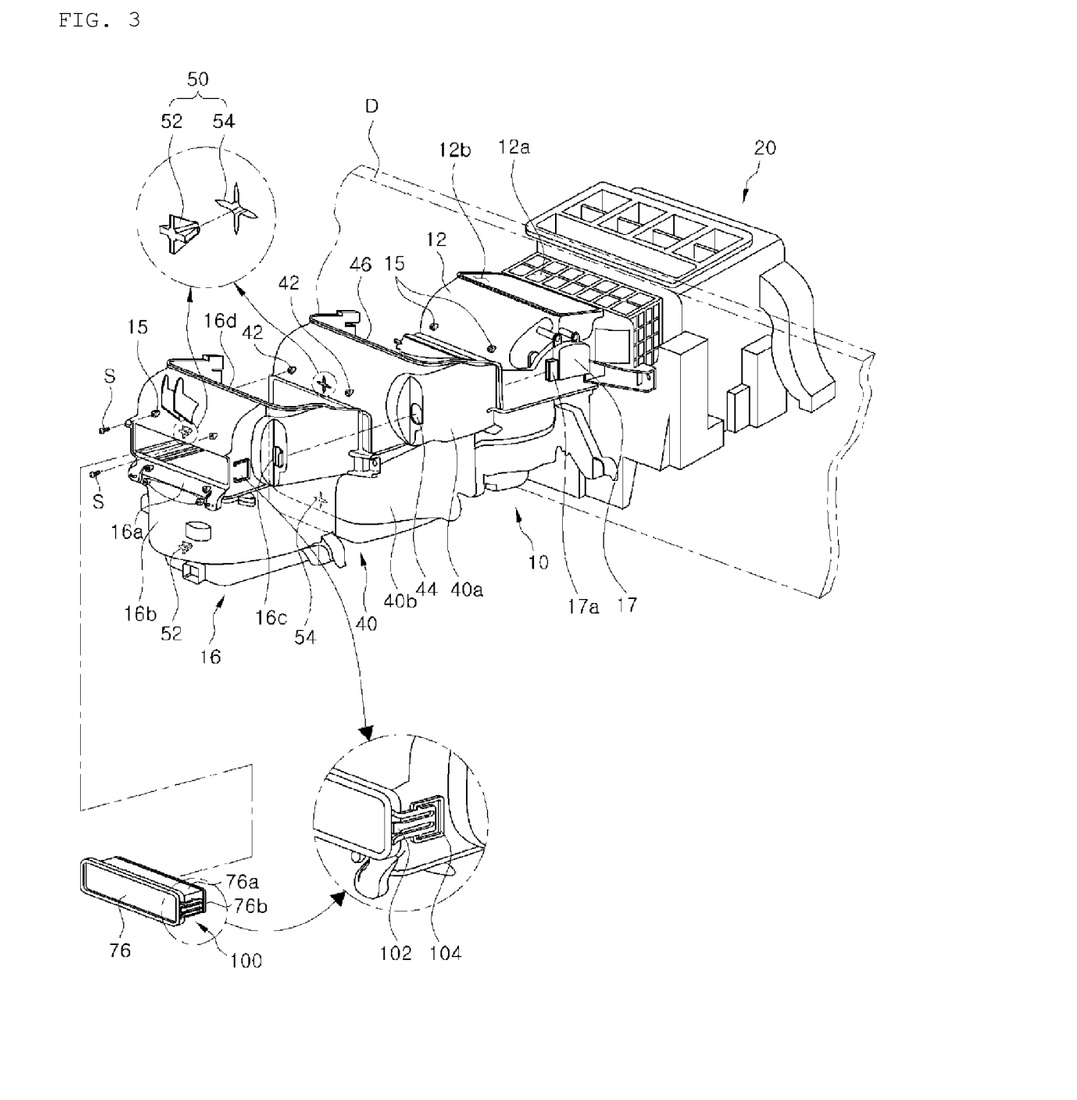
FIG. 3 is a perspective view showing the configuration of a vehicle air conditioner according to the present invention.
Figure 4:
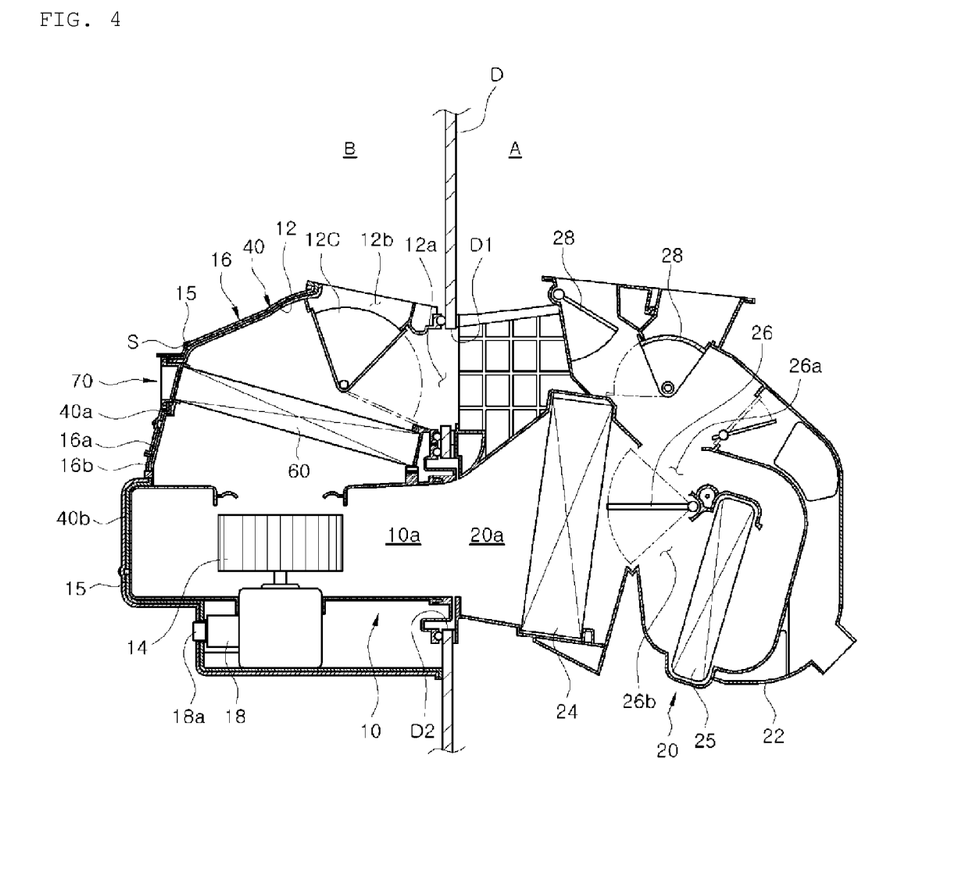
FIG. 4 is a vertical cross-sectional view showing the configuration of the vehicle air conditioner according to the present invention and showing the assembled state of FIG. 3.

First, referring to FIGS. 3 and 4, a vehicle air conditioner according to the present invention includes an intake unit 10 that suctions and blows interior/exterior air to an interior A, and a heat exchanger unit 20 that cools or heats the air that is blown to the interior A.

The intake unit 10 is disposed in an engine room B with respect to a dash panel D and includes an intake case 12.

The intake case 12 has an internal-air intake port 12a and an external-air intake port 12b, and an intake door 12c is installed between the internal-air intake port 12a and the external-air intake port 12b.

The internal-air intake port 12a communicates with the interior A through a first through-hole D1 of the dash panel D and introduces the air in the interior into the intake case 12. The external-air intake port 12b communicates with the outside of the vehicle and introduces the air outside the vehicle into the intake case 12.

The intake door 12c, which is a dome type door that is rotated between the external-air intake port 12b and the internal-air intake port 12a, selectively opens the external-air intake port 12b or the internal-air intake port 12a. Accordingly, external air or internal air can be selectively introduced.

A blower 14 is installed in the intake case 12.

The blower 14 suctions internal air or external air through the external-air intake port 12b and the internal-air intake port 12a over the blower 14, discharges the suctioned internal and external air to an internal channel 10a, and blows the discharged internal and external air to the heat exchanger unit 20.

A case cover 16 is installed on the outer surface of the intake case 12.

Figure 5:
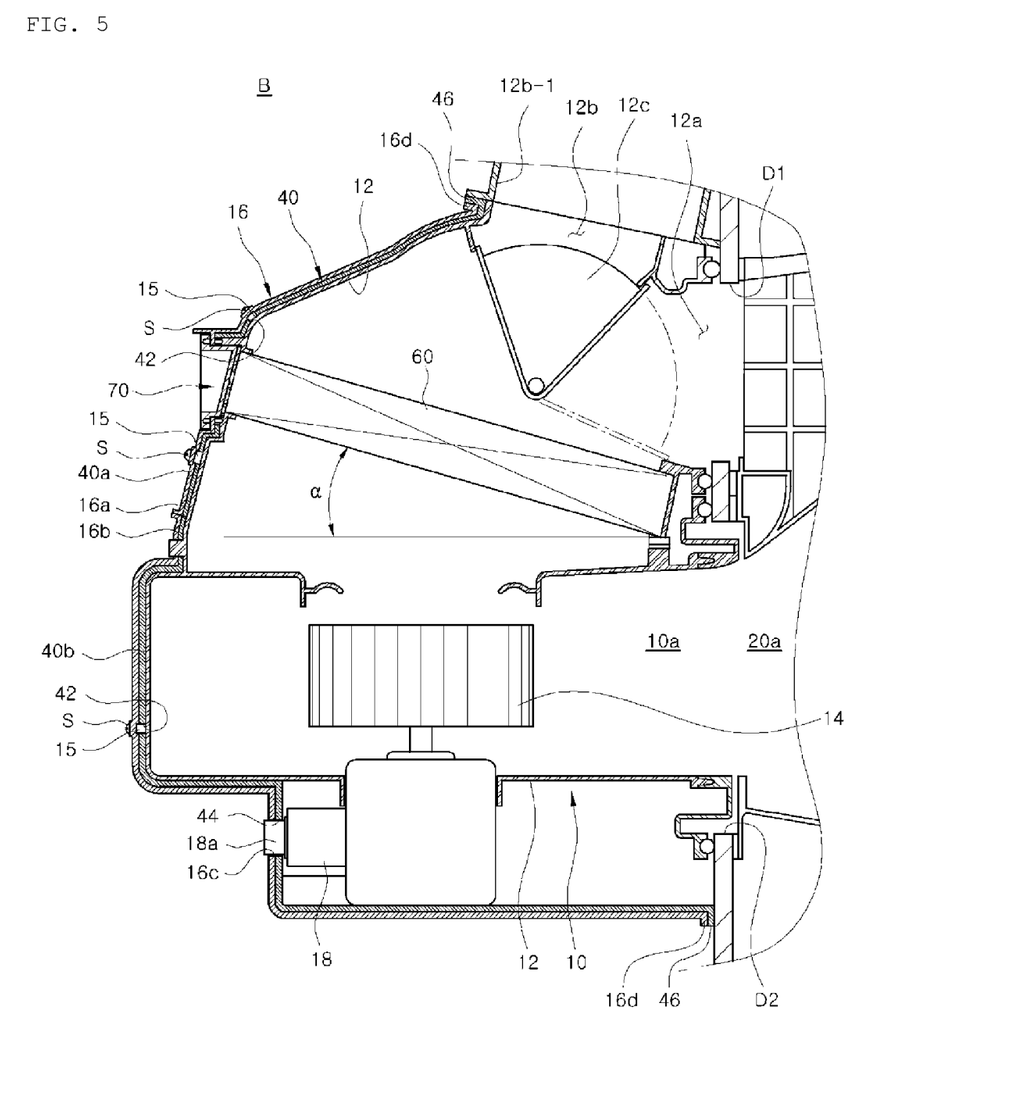
FIG. 5 is an enlarged vertical cross-sectional view showing an intake unit of the vehicle air conditioner according to the present invention.

The case cover 16, as shown in FIGS. 3 to 5, is installed on the portion, which corresponds to the engine room B, of the outer surface of the intake case 12. In particular, the case cover 16 is installed to cover the entire outer surface exposed to the engine room B.

Since the case cover 16 covers the entire outer surface of the intake case 12 in the engine room B, the case cover 16 protects the intake unit 10 from noise, foreign substances, and shock in the engine room B.

In particular, the case cover 16 protects the intake unit 10 from various contaminant, water, and shock that are produced in the engine room B or are applied from the outside. Accordingly, the case cover 16 prevents the intake unit 10 from being damaged and broken by various contaminants, water, and shock.

The case cover 16 primarily prevents noise from entering the intake case 12 from the engine room B. Accordingly, the case cover 16 preclude noise from entering the interior through the intake case 12 from the engine room B.

The case cover 16 is fastened to the intake case 12 by screws S and thread-fastening portions for fastening the screws S are formed at several positions at the case cover 16 and the intake case 12.

The cover case 16 has a shape corresponding to the outer shape of the intake case 12 and has a structure that is in close contact with the outer surface of the intake case 12.

The case cover 16 is made of a hard synthetic resin material and is formed by injection molding to fit to the shape of the outer surface of the intake case 12.

The case cover 16 is divided into a plurality of bodies 16a and 16b. In particular, the intake case 12 is divided into an upper body 16a corresponding to the upper part and a lower body 16b corresponding to the lower part.

This configuration is for securing convenience when combining the case cover 16 with the intake case 12.

Further, this is for more easily forming the case cover 16 through injection molding. In particular, the case cover 16 should be formed to fit to the outer surface of the intake case 12, but the shape of the outer surface of the intake case 12 is very complicated, so it is difficult to form the case cover 16 as a single unit through injection molding.

The case cover 16 has through-holes 16c corresponding to electric connectors 17a and 18a of various electric parts 17 and 18 installed on the outer surface of the intake case 12, for example, an intake door actuator 17 and a blower actuator 18.

The through-holes 16c are aligned with the electric connectors 17a and 18a of various electric parts 17 and 18 of the intake case 12 and pass the electric connectors 17a and 18a of the electric parts 17 and 18 when the case cover 16 is installed on the outer surface of the intake case 12.

Accordingly, even through the case cover 16 is installed on the intake case 12, external connectors (not shown) can be connected to the electric connectors 17a and 18a of various electric parts 17 and 18 of the intake case 12.

The case cover 16 further has a flange 16d formed along the edge.

Figure 8:
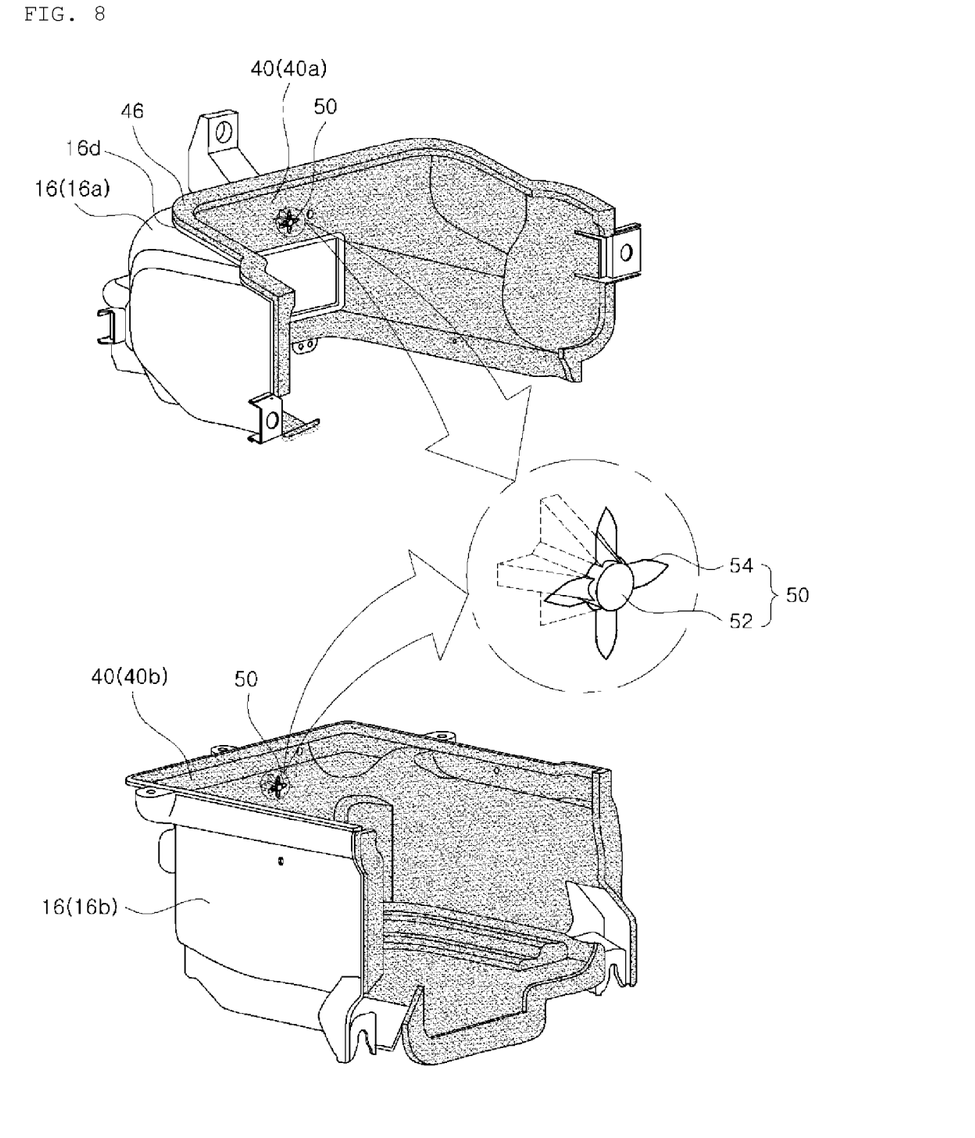
FIG. 8 is a perspective view showing a case cover and a soundproof member of the vehicle air conditioner according to the present invention.
Figure 9:
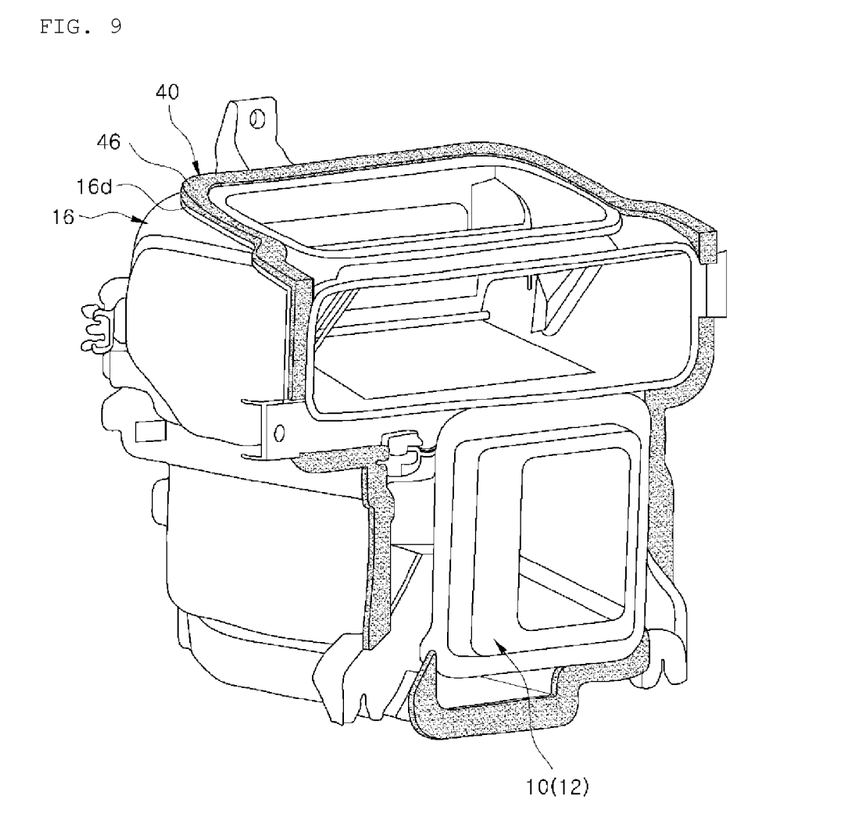
FIG. 9 is a perspective view showing the state in which the case cover and the soundproof member of the vehicle air conditioner according to the present invention are coupled to an intake case.

The flange 16d, as shown in FIGS. 5, 8, and 9, is configured to be able to come in surface contact with the dash panel D and an intake duct 12b-1 of the external-air intake port 12b of the intake case 12 when the case cover 16 is installed on the intake case 12.

Accordingly, the case cover 16 is more firmly brought in contact with the dash panel D and the intake duct 12b-1.

Referring to FIGS. 3 to 5, the air conditioner of the present invention includes case-soundproof member 40 installed between the intake case 12 and the case cover 16.

The case-soundproof member 40 is made of a soft material having very excellent soundproof and sound-absorbing ability, for example, an urethane material, and is disposed between the intake case 12 and the case cover 16 without a gap.

In particular, both sides of the case-soundproof member 40 are in close contact with the intake case 12 and the caser cover 16 without a gap, respectively.

The case-soundproof member 40 blocks noise that is transmitted from the engine room B.

In particular, even though the case cover 16 installed on the outer surface of the intake case 12 primarily blocks the noise in the engine room B, the noise in the engine room B enters the intake case 12 through the case cover 16, so the case-soundproof member 40 secondarily blocks the noise in the engine room B.

Accordingly, the efficiency of blocking noise transmitted to the intake case 12 from the engine room B is remarkably improved. Accordingly, the noise from the engine room B is precluded from entering the interior through the intake case 12.

As a result, the noise from the engine room B cannot enter the interior even though the intake unit 10 is installed in the engine room B, whereby it is possible to improve quietness in the interior even though the intake unit 10 is installed in the engine room B.

The case-soundproof member 40 has a shape corresponding to the shape of the outer surface of the intake case 12. The case-soundproof member 40 having this configuration is coupled to the inner surface of the case cover 16 in close contact with the outer surface of the intake case 12.

An aligning-coupling mechanism 50 that can align and couple the case cover 16 and the case-soundproof member 40 to each other is formed at the case cover 16 and the case-soundproof member 40, as shown in FIGS. 3 and 8.

The aligning-coupling mechanism 50 is composed of coupling protrusions 52 formed with regular intervals on the inner side of the case cover 16 and coupling grooves 54 formed at the case-soundproof member 40 to be able to be coupled to the coupling protrusions 52, respectively.

The coupling protrusions 52 and the coupling grooves 54 are each arranged in a cross shape. The cross-shaped coupling protrusions 52 and the coupling grooves 54 are fitted to each other when the case-soundproof member 40 is aligned in close contact with the inner side of the case cover 16, as shown in FIG. 8.

Accordingly, the case cover 16 and the case-soundproof member 40 can be aligned and coupled to each other.

Referring to FIGS. 3 to 5, threaded holes 42 that are aligned with the thread-fastening portions 15 of the case cover 16 and the intake case 12 are formed at the case-soundproof member 40.

The threaded holes 42 are aligned with the thread-fastening portions 15 of the case cover 16 and the case-soundproof member 40, thereby passing the screws S when the case cover 16 and the case-soundproof member 40 are fastened by the screws S.

The case-soundproof member 40 is installed between the intake case 12 and the case cover 16 and is divided into two parts. In particular, the case-soundproof member 40 is divided into a first partial body 40a and a second partial body 40b to be able to correspond to the upper body 16a and the lower body 16b of the case cover 16, respectively.

The case-soundproof member 40 has through-holes 44 that can be aligned with the through-holes 16c of the case cover 16, respectively.

The through-holes 44 of the case-soundproof member 40, similar to the through-holes 16c of the case cover 16, correspond to the electric connectors 17a and 18a of various electric parts 17 and 18 installed on the outer surface of the intake case 12, for example, the intake door actuator 17 and the blower actuator 18.

Accordingly, the through-holes 44 are aligned with the electric connectors 17a and 18a of various electric parts 17 and 18 of the intake case 12 and pass the electric connectors 17a and 18a of the electric parts 17 and 18 when the case cover 16 and the case-soundproof member 40 are installed on the outer surface of the intake case 12.

Further, the case-soundproof member 40, as shown in FIGS. 3, 5, and 8, has a sealing flange 4 that can correspond to the flange 16d of the case cover 16.

The sealing flange 46 overlaps the outer surface of the flange 16d of the case cover 16 when the case-soundproof member 40 is coupled to the inner side of the case cover 16.

The sealing flange 46, as shown in FIG. 5, is configured to be able to come in surface contact with the dash panel D and the intake duct 12b-1 of the external-air intake port 12b of the intake case 12 when the case cover 16 and the case-soundproof member 40 are installed on the outer surface of the intake case 12.

Accordingly, the sealing ability of the case cover 16 for the dash panel D and the intake duct 12b-1 is increased. Accordingly, as the sealing ability of the intake unit 10 to the engine room B is increased, various contaminants, water, noise, etc. produced in the engine room B cannot enter the intake unit 10.

Meanwhile, referring to FIGS. 3 and 4, the heat exchanger unit 20 is installed in the interior A with respect to the dash panel D and includes a heat exchanger case 22.

The heat exchanger case 22 is installed to correspond to the intake unit 10 and the intake case 2 with the dash panel D therebetween, and has an internal channel 20a that communicates with the internal channel 10a of the intake case 12.

The internal channel 20a communicates with the internal channel 10a of the intake unit 10 through a second through-hole D2 of the dash panel D. An evaporator 24, a heater 25, a temp door 26, and several mode doors 28 are installed in the internal channel 20a.

The evaporator 24 cools and supplies the air blown from the intake unit 10 to the interior and the heater 25 heats and supplies the air blown from the intake unit 10 to the interior.

The temp door 26 adjusts the amount of opening of a cold-air channel 26a and a hot-air channel 26b while rotating between the cold-air channel 26a and the hot-air channel 26b. Accordingly, the temp door 26 adjusts the amount of cold air and hot air that are supplied to the interior.

The mode doors 28 adjust the discharge direction of the air that is supplied to the interior.

Referring to FIGS. 3 to 7, the air conditioner of the present invention further includes an air filter 60 installed in the intake unit 10.

The air filter 60 is installed in the internal channel 10a of the intake unit 10. In particular, the air filter 60 is installed in the internal channel 10 at the upstream side form the blower 14.

The air filter 60 filters internal and external air that is suctioned to the inlet of the blower 14. Accordingly, the air filter 60 increases the cleanness of the air that is blown to the interior.

The air filter 60 can be taken out from the outside of the case cover 16 and a separate filter extractor 70 is provided to extract the air filter 60.

Figure 6:
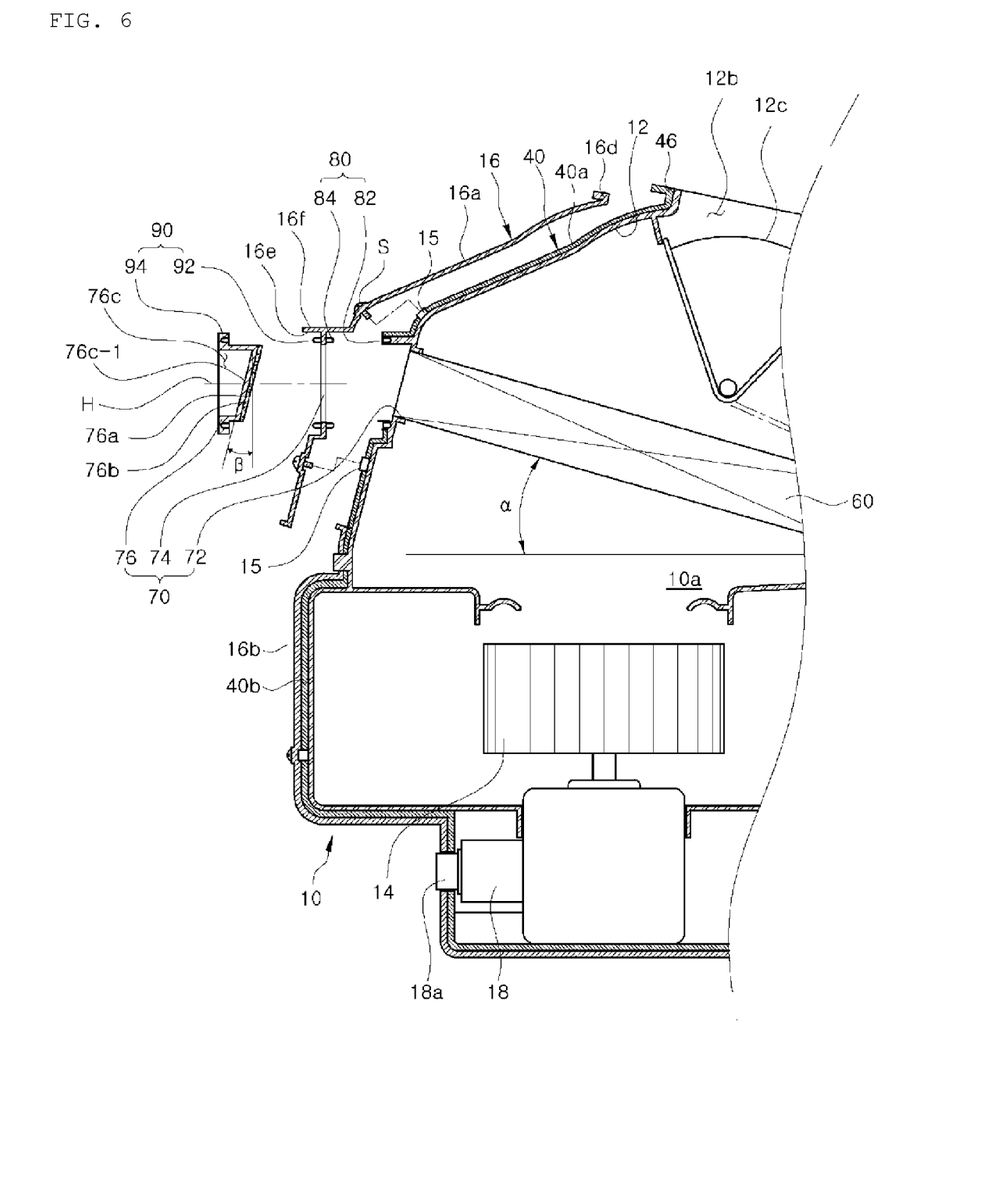
FIG. 6 is a cross-sectional view in which a case cover and a filter extractor of the intake unit of the vehicle air conditioner according to the present invention are separated from the intake unit.
Figure 7:
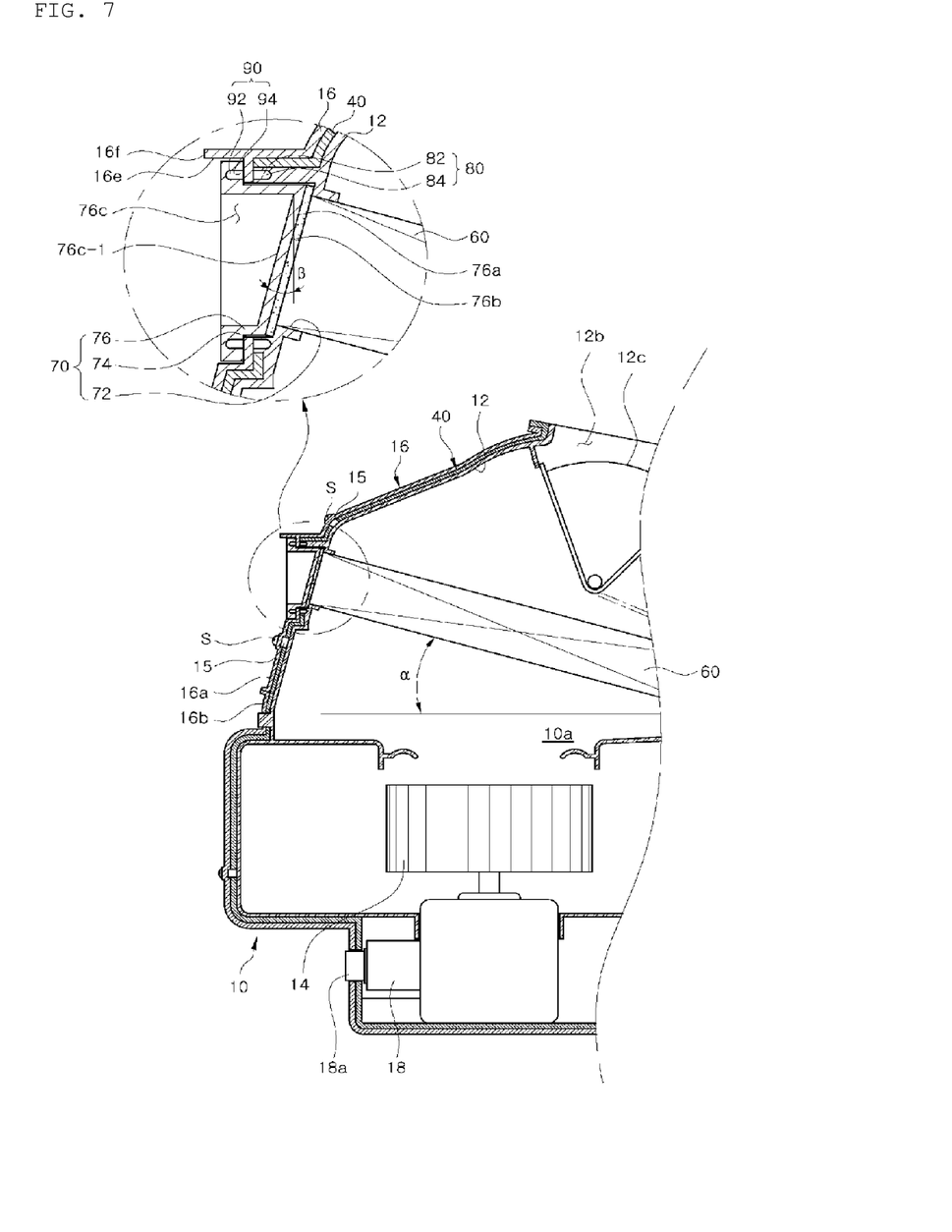
FIG. 7 is a cross-sectional view in which the case cover and the filter extractor of the intake unit of the vehicle air conditioner according to the present invention are coupled to the intake unit.

The filter extractor 70, as shown in FIGS. 6 and 7, includes a first filter port 72 formed a the intake case 12 of the intake unit 10, a second filter port 74 formed at the case cover 16 and the case-soundproof member 40 to be able to be aligned with the first filter port 72, and a filter cover 76 being able to open/close the second filter port 74.

The first filter port 72 is formed on the outer surface of the intake case 12. In particular, the first filter port 72 is formed on the outer surface of the intake case 12 toward the inside of the engine room B.

The first filter port 72 enables the air filter mounted in the internal channel 10a of the intake case 12 to be extracted outside or inserted inside. In particular, the first filter port 72 enables the air filter 60 to be extracted from the internal channel 10a of the intake case 10 or to be inserted into the internal channel 10a of the intake case 12.

The air filter 60 has a structure to be inclined at a predetermined angle α when it is mounted into the internal channel 10a of the intake case 12. In particular, the air filter 60 is inclined at a predetermined angle α such that the front portion corresponding to the front of the vehicle is positioned higher than the rear portion corresponding to the rear of the vehicle.

The reason of this configuration is for inclining the air filter 60 at a predetermined angle α when extracting or inserting the air filter 60 through the first filter port 72.

In particular, this is for extracting the air filter 60 in an upward type and inserting the air filter 60 in a downward type, whereby it is possible to more conveniently extract and insert the air filter 60.

Further, since various devices and parts are installed around the intake unit 10 in the engine room B, it is possible to more conveniently extract and insert the air filter 60 while avoiding interference with the various devices and parts.

Since the air filter 60 is mounted at a predetermined angle α, the first filter port 72 of the intake unit 10 and the second filter port 74 of the case cover 16 for extracting and inserting the air filter 60 are also formed to correspond to the inclination.

The second filter port 74 is formed at the portion of the case cover 16 which corresponds to the first filter port 72 of the intake unit 10. Further, the second filter port 74 is formed also at the case-soundproof member 40.

The second filter port 74 is aligned with the first filter port 72 of the intake unit 10 when the case cover 16 and the case-soundproof member 40 are coupled to the intake case 12.

The second filter port 74 having this configuration enables, in cooperation with the first filter port 72 of the intake unit 12, the air filter 60 mounted in the internal channel 10a of the intake case 10 to be extracted out of the case cover 16 or the air filter 60 to be inserted into the internal channel 10a of the intake case 12 from the outside of the case cover 16.

The second filter port 74 of the case cover 16 has a size larger than that of the first filter port 72 of the intake unit 10. In particular, the second filter port 74 has an area larger than that of the first filter port 72.

The second filter port 74 of the case cover 16 should keep a sealing ability with the first filter port 72 of the intake unit 10.

This is for preventing air from leaking inside and outside through the portion between the first filter port 72 and the second filter port 74.

In order to keep sealing between the first and second filter ports 72 and 74, a specific filter port sealing part 80 is formed at the case cover 16 and the intake unit 10.

The filter port sealing part 80 is composed of a groove 82 formed at the intake case 12 around the first filter port 72 and a tongue 84 formed at the case cover 16 around the second filter port 74 to be fitted to the groove 82.

The tongue 84 and the groove 82 are hermetically fitted to each other when the case cover 16 is coupled to the intake case 12, and high sealability is maintained between the first filter port 72 of the intake unit 10 and the second filter port 74 of the case cover 16 by the hermetic coupling of the tongue 84 and the groove 82.

Accordingly, inward and outward leakage of air is prevented between the first filter port 72 of the intake unit 10 and the second filter port 74 of the case cover 16.

The tongue 84 and the groove 82 of the filter port sealing part 80 are fitted to each other when the case cover 16 is coupled to the intake case 12. In this case, the thread-fastening portions 15 for fixing the case cover 16 to the intake case 12 may be formed portions of the case cover 16 and the intake case 12 which correspond to the portions around the tongue 84 and the groove 82 of the filter port sealing part 80.

This is for enabling the tongue 84 and the groove 82 of the filter port sealing part 80 to be fitted to each other with a higher degree of fitting when the case cover 16 and the intake case 12 are thread-fastened to each other.

Referring to FIGS. 3 to 7, the filter cover 76, which opens and closes the second filter port 74 of the case cover 16, has a cap 76a corresponding to the second filter port 74.

The cap 76a protrudes toward the second filter port 74 of the case cover 16 from the filter cover 76. The cap 76a protruding in this type closes the second filter port 74 by directly blocking it.

The cap 76a may have a size that is the same as or slightly smaller than that of the second filter port 74. In particular, the cap 76a protrudes with an area that is the same as or slightly smaller than that of the second filter part 74.

The cap 76a reaches the first filter port 72 of the intake unit 10 while closing the second filter port 74 when it is fully inserted in the second filter port 74.

In particular, the cap 76a blocks and closes the first filter port 72 of the intake unit 10 when it reaches the first filter port 72 of the intake unit 10.

The cap 76a has a size larger than that of the first filter port 72. In particular, the cap 76a protrudes with a cross-sectional area larger than the area of the first filter port 72.

This is for completely blocking and closing the intake unit 10 even around the first filter port 72, whereby it is possible to increase the efficiency of closing the first filter port 72.

Since the cap 76a of the filter cover 76 blocks even the first filter port 72 of the intake unit 10 when it is inserted in the second filter port 74 of the case cover 16, whereby it is possible to block and close both of the first and second filter ports 72 and 74 of the case cover 16 and the intake unit 10.

A sealer 76b is installed at the cover 76a of the filter cover 76.

The sealer 76b is made of any one of rubber, silicone, sponge, and urethane foam, and is configured to correspond to the first filter port 72 of the intake unit 10.

The sealer 76b hermetically seals the portion between the cap 76a of the filter cover 76 and the first filter port 72 of the intake unit 10.

In particular, the sealer 76b is compressed and hermetically seals the portion between the cap 76a and the first filter port 72 when the cap 76a of the filter cover 76 closes the first filter port 72 of the intake unit 10.

Accordingly, inward and outward leakage of air between the cap 76a and the first filter port 72 is precluded. The sealer 76b compresses also the air filter 60 installed in the first filter port 72. Accordingly, movement of the air filter 60 is prevented.

A seat groove 16e in which the filter cover 76 can be seated is formed at a portion of the case cover 16 around the second filter port 74.

Since the filter cover 76 is seated in the seat groove 16e, the contact surface between the case cover 16 and the filter cover 76 increases. Further, since the contact area increases, sealability of the filter cover 76 to the second filter port 74 increases.

The direction in which the filter cover 76 is seated in the seat groove 16e of the case cover 16 is the horizontal direction H.

This is for opening and closing the filter cover 76 horizontally (H) with respect to the second filter port 74 of the case cover 16.

In particular, unlike the air filter 60 that is extracted and inserted at a predetermined angle α, the filter over 76 is horizontally (H) opened and closed with respect to the second filter port 74, so it is possible to more easily and directly couple the filter cover 76.

Referring to FIGS. 6 and 7, high sealability should be secured between the case cover 16 and the filter cover 76.

In particular, high sealability should be maintained between the case cover 16 and the filter cover 76 to prevent inward and outward leakage of air through the second filter port 74 of the case cover 16.

In order to maintain sealability between the case cover 16 and the filter cover 76, a specific filter cover sealing part 90 is formed at the case cover 16 and the filter cover 76.

The filter cover sealing part 90 is composed of a tongue 92 formed at the seat groove 16a of the case cover 16 around the second filter port 74 and a groove 84 formed around the edge of the filter cover 76 to be fitted to the tongue 92.

The tongue 92 and the groove 94 are hermetically fitted to each other when the filter cover 76 is coupled to the case cover 16. Since the tongue 92 and the groove 94 are hermetically fitted to each other, high sealability is maintained between the case cover 16 and the filter cover 76.

Accordingly, inward and outward leakage of air is prevented between the second filter port 74 of the case cover 16 and the filter cover 76.

The tongue 92 and the groove 94 of the filter cover sealing part 90 and the tongue 84 and the groove 82 of the filter port sealing part 80 are aligned with each other.

In particular, the tongue 92 and the groove 94 of the filter cover sealing part 90 and the tongue 84 and the groove 82 of the filter port sealing part 80 are horizontally (H) aligned with each other.

This is for aligning both the fitting direction of the tongue 92 and the groove 94 of the filter cover sealing part 90 and the fitting direction of the tongue 84 and the groove 82 of the filter port sealing part 80 with the horizontal opening/closing direction (H) of the filter cover 76.

Accordingly, when the filter cover 76 is horizontally seated in the seat groove 16e of the case cover 16 to close the first and second filter ports 72 and 74 of the intake unit 10 and the case cover 16, the tongue 92 and the groove 94 of the filter cover sealing part 90 and the tongue 84 and the groove 82 of the filter port sealing part 80 can also be fitted.

Referring to FIGS. 6 and 7, the filter cover 76 further has a recessed groove 76c on the front surface.

The recessed groove 76c is recessed in a shape corresponding to the cap 76a on the rear surface of the filter cover 76 and is formed toward the front of the vehicle. The bottom 76c-1 of the recessed groove 76c, that is, the bottom 76c-1 facing the front of the vehicle is inclined at a predetermined angle β toward the outside of the case cover 16 as it goes down.

The reason is for enabling water to flow out of the case cover 16 when water flowing in the recessed groove 76c of the filter cover 76.

In particular, when the vehicle is washed or it rains, a large amount of water can enter the engine room B and flow inside the filter cover 76. Accordingly, the bottom 76c-1 is inclined, as described above, to enable water flowing inside the filter cover 76 to flow out of the case cover 16.

A water-blocking protruding rib 16f is formed at a side of the case cover 16 which correspond to the top of the recessed groove 76c of the filter cover 76.

The water-blocking protruding rib 16f horizontally extends and protrudes toward the top of the filter cover 76 from a side of the case cover 16.

In particular, the water-blocking protruding rib 16f extends to protrude further than the top of the filter cover 76 from a side of the case cover 16. The water-blocking protruding rib 16f extending and protruding in this way prevents water from falling to the filter cover 76 when the vehicle is washed or it rains and water flows into the engine room B from above.

Referring to FIG. 3, the filter cover 76 is separably coupled to the case cover 16 by a coupling mechanism 100.

The coupling mechanism 100 includes hooks 102 formed on both sides of the filter cover 76, respectively, and locking grooves 104 formed at the case cover 16 to lock the hooks 102, respectively.

The hooks 102 and the locking groove 104 are fitted to each other to close the second filter port 74 of the case cover 16 when the filter cover 76 is horizontally seated in the seat groove 16e of the case cover 16.

Accordingly, the filter cover 76 can be coupled and fixed while closing the second filter port 74 of the case cover 16.

According to the air conditioner having this configuration of the present invention, since the intake unit 10 is disposed in the engine room B and the heat exchanger unit 20 disposed in the interior, the portion of the air conditioner that is disposed in the interior can be minimized.

Further, since the portion of the air conditioner that is disposed in the interior can be minimized, it is easy to secure space in the interior, the spatial usability of the interior is increased, whereby it is possible to remarkably improve convenience for passengers.

Further, since the intake unit 10 is installed in the engine room B and is covered with separate case cover 16 and case soundproofing member 40, it is possible to keep the intake unit 10 safe against noise, foreign substances, and water in the engine room B.

In particular, the case cover 16 and the case soundproofing member 40 that cover the intake unit 10 prevent noise in the engine room B from entering inside the intake case 12. Accordingly, even though the intake unit 10 is installed in the engine room B, the noise from the engine room B cannot enter the interior, so quietness of the interior can be improved.

Further, since the structure for extracting and inserting the air filter 60 that is installed in the intake unit 10 is improved, the air filter 60 can be very easily extracted and inserted even though the intake unit 10 is installed in the engine room B, whereby it is possible to more easily replace the air filter 60.

Further, since the structure for extracting and inserting the air filter 60 is improved, the air filter 60 can be easily extracted and inserted even though a triple case structure is formed by installing the case cover 16 and the case soundproofing member 40 on the outer surface of the intake unit 10. Accordingly, it is possible to more easily replace the air filter 60 without inward and outward leakage of air.

Although exemplary embodiments of the present invention were described above, the scope of the present invention is not limited to the specific embodiments and the present invention may be appropriately changed within the scope described in claims.

The invention claimed is:

1. A vehicle air conditioner that performs cooling and heating by supplying cold air and hot air in an interior of the vehicle, the vehicle air conditioner comprising:
   an intake unit installed at an engine room and configured for suction and blowing of internal and external air to the interior;
   a heat exchanger unit configured to cool or heat air blown from the intake unit and supply the cooled or heated air to the interior of the vehicle;
   a case cover installed on an outer surface of the intake unit to cover the intake unit;
   a case soundproofing member installed between an intake case of the intake unit and the case cover and configured to block noise that is transmitted to the intake case from the outside of the case cover; and
   a filter extractor configured to enable an air filter installed in an internal channel of the intake unit to be extracted from the outside of the case cover,
   wherein the filter extractor includes:
      a first filter port formed at the intake case of the intake unit;
      a second filter port formed at the case cover to be able to be aligned with the first filter port; and
      a filter cover configured to be able to open and close the second filter port,
   wherein the filter cover has a cap protruding toward the second filter port of the case cover, and the cap directly blocks and closes the second filter port of the case cover when the second filter port is closed by the filter cover,
   wherein the cap of the filter cover has a cross-sectional area that is the same as or slight smaller than a cross-sectional size of the second filter port and closes both the first and second filter ports by directly blocking the first filter port of the intake unit while passing through the second filter port when the second filter port is closed by the filter cover,
   wherein the second filter port of the case cover has an area that is larger than the first filter port of the intake unit; and
   wherein the cap of the filter cover has a cross-sectional area that is larger than an area of the first filter port, thereby blocking and closing even a portion of the intake unit around the first filter port.

2. The vehicle air conditioner of claim 1, wherein the air filter is mounted at a predetermined angle in the interior channel of the intake unit such that a front portion corresponding to a front of vehicle is positioned higher than a rear portion corresponding to a rear of the vehicle; and
   the first and second filter ports of the filter extractor enable the air filter to be extracted or inserted at the predetermined angle to correspond to a mounted posture of the air filter inclined at the predetermined angle.

3. The vehicle air conditioner of claim 1, wherein a sealer corresponding to the first filter port of the intake unit is installed at the cap of the filter cover; and
   the sealer hermetically seals the portion between the cap of the filter cover and the first filter port of the intake unit.

4. The vehicle air conditioner of claim 3, wherein a seat groove in which the filter cover can be seated is formed at a portion of the case cover around the second filter port; and
   the filter cover is seated in the seat groove of the case cover when closing the second filter port.

5. The vehicle air conditioner of claim 4, wherein the seat groove of the case cover has a structure enabling the filter cover to be horizontally moved and seated; and
   the filter cover is horizontally opened and closed with respect to the second filter port by the structure horizontally seating the filter cover in the seat groove.

6. The vehicle air conditioner of claim 5, wherein the filter cover further has a recessed groove recessed from a front surface in a shape corresponding to the cap at a rear surface; and
   a bottom of the recessed groove in the engine room is inclined at a predetermined angle toward the outside of the cover case as it goes down, thereby guiding smooth discharge of water when the water flows inside from the outside.

7. The vehicle air conditioner of claim 6, wherein a water-blocking protruding rib extends to protrude further than the filter cover at a side of the case cover that corresponds to a top of the filter cover; and
   the water-blocking protruding rib blocks the water that flows into a portion between the top of the filter cover and the case cover.

8. The vehicle air conditioner of claim 1, further comprising:
   a filter port sealing part configured to prevent air leakage to the outside from a portion between the first filter port of the intake unit and the second filter port of the case cover; and
   a filter cover sealing part configured to prevent air leakage between the case cover and the filter cover.

9. The vehicle air conditioner of claim 1, wherein the case cover and the case soundproofing member are configured in a shape corresponding to a shape of an outer surface of the intake case, and
   the case cover, the case soundproofing member, and the intake case are in close contact with one another without a gap.

10. The vehicle air conditioner of claim 9, wherein the case cover and the case soundproofing member have an aligning-coupling mechanism that can align and couple the case cover and the case soundproofing member to each other.

11. The vehicle air conditioner of claim 10, wherein the aligning-coupling mechanism include:
several coupling protrusions formed with regular intervals on an inner side of the case cover; and
several coupling grooves formed at the case soundproofing member to be fitted to the coupling protrusions, respectively,
wherein the coupling protrusions and the coupling grooves are fitted to each other when the case soundproofing member is aligned in close contact with the inner side of the case cover, thereby aligning and coupling the case cover and the case soundproofing member.

12. The vehicle air conditioner of claim 11, wherein the case cover is divided into a plurality of parts; and
the case soundproofing member is also divided into a plurality of parts to correspond to partial bodies of the case cover.

13. The vehicle air conditioner of claim 12, wherein the case cover is divided into an upper body corresponding to an upper part of the intake case and a lower body corresponding to a lower body of the case cover; and
the case soundproofing member is divided into a first partial body corresponding to the upper body of the case cover and a second partial body corresponding to the lower body of the case cover.

14. The vehicle air conditioner of claim 13, wherein the case cover and the case soundproofing member each have through-holes corresponding to electric connectors of electric parts installed in the intake case, and
the through-holes are aligned with the electric connectors of the electric parts when the case cover and the case soundproofing member are installed at the intake case, thereby allowing external connectors to be connected to the electric connectors of the electric parts at the intake case.

15. The vehicle air conditioner of claim 14, wherein the case cover has a flange formed along an edge;
the case soundproofing member has a sealing flange around an edge that can overlap an outer surface of the flange of the case cover; and
the flange and the sealing flange overlapping each other hermetically come in close contact with each other while coming in surface contact with a dash panel and an intake duct installed at an external air intake port of the intake case when the case cover and the case soundproofing member are installed at the intake case.

* * * * *